Patented Oct. 9, 1923.

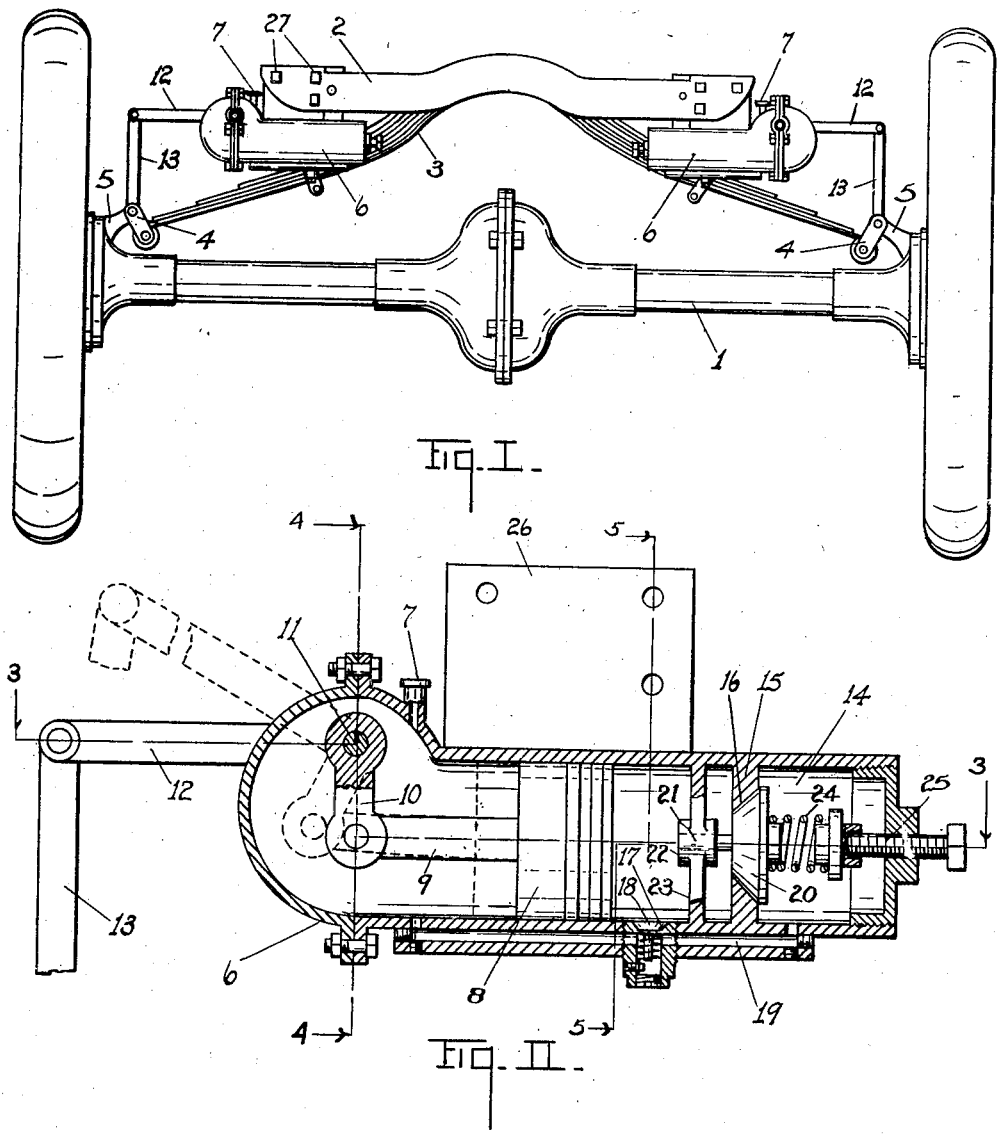

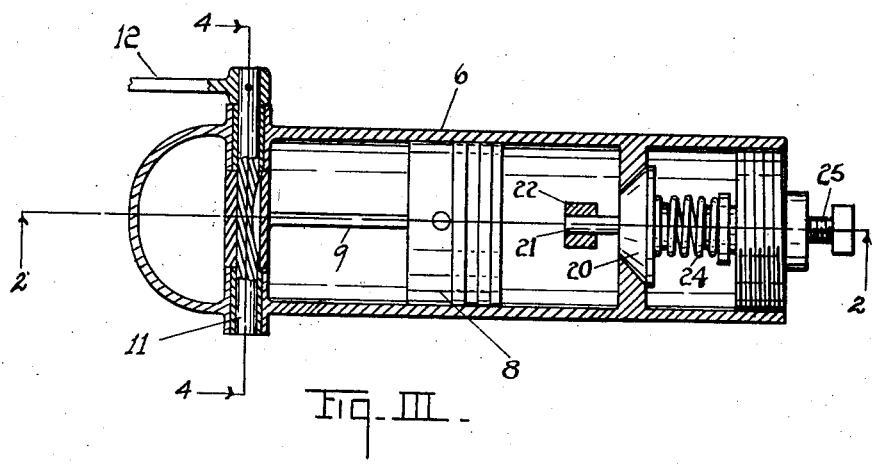
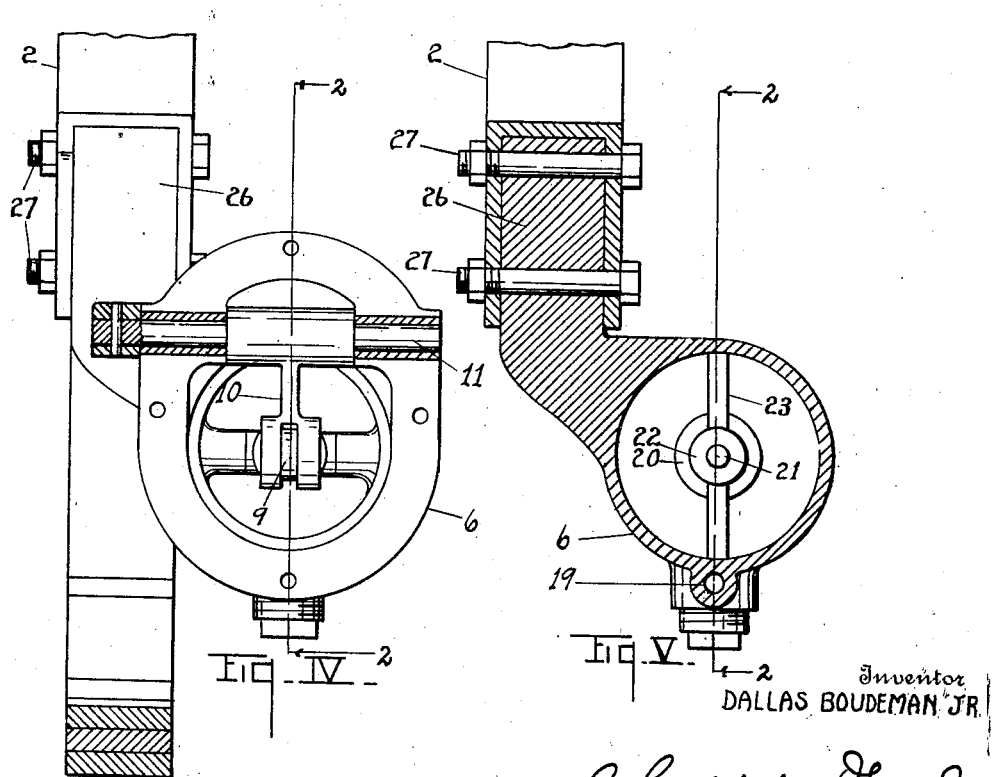

1,469,915

UNITED STATES PATENT OFFICE.

DALLAS BOUDEMAN, JR., OF KALAMAZOO, MICHIGAN.

SHOCK ABSORBER.

Application filed January 24, 1921. Serial No. 439,500.

*To all whom it may concern:*

Be it known that I, DALLAS BOUDEMAN, Jr., a citizen of the United States, residing at Kalamazoo, county of Kalamazoo, State of Michigan, have invented certain new and uesful Improvements in Shock Absorbers, of which the following is a specification.

This invention relates to improvements in shock absorbers.

The main objects of this invention are:

First, to provide an improved shock absorber by which the rebound of the spring is cushioned or checked according to the degree or extent of the compression of the spring.

Second, to provide an improved shock absorber which is simple in structure and may be quickly attached to vehicles in quite common use.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a rear elevation of parts of a popular make of automobile having my improved shock absorber applied thereto, only such parts of the vehicle being shown as are deemed necessary to illustrate an application of my improvements.

Fig. II is a vertical central section through the cylinder of my improved shock absorber on a line corresponding to line 2—2 of Figs. III, IV and V.

Fig. III is a detail horizontal section on a line corresponding to line 3—3 of Fig. II.

Fig. IV is a detail transverse section on a line corresponding to line 4—4 of Figs. II and III.

Fig. V is a detail transverse section on a line corresponding to line 5—5 of Fig. II.

In the drawing similar reference characters refer to similar parts throughout the several views, and the sectional views are taken looking in the direction of the little arrows at the ends of the section lines.

Referring to the drawing, 1 represents the rear axle of a motor vehicle, 2 the rear cross member of the vehicle body and 3 the rear spring which is supported by the hangers 4 on the brackets 5. The parts illustrated are those of a popular pleasure car.

I provide a pair of cylinders 6 adapted to contain a fluid or are fluid-tight, the same being in practice preferably filled with a liquid, filling caps 7 being provided. As these cylinders are duplicates only one will be described.

The piston 8 is connected by the connecting rod 9 to an arm 10 on the rock shaft 11. This rock shaft has an actuating arm 12 on its outer end connected by the link 13 to the spring supporting bracket 5 on the running gear so that as the body or axle moves relatively through the flexing of the spring 3 the piston is moved in the cylinder.

As its outer end the cylinder is provided with a chamber 14 separated from the piston chamber by the partition 15 having the central cylinder relief or discharge port 16. The cylinder is provided with an inlet port 17 controlled by the inlet valve 18.

The chamber 14 is connected to this port by the passage 19 which also opens into the inner end of the cylinder beyond the stroke of the piston.

The relief port 16 is provided with a valve 20 having an inwardly projecting stem 21 arranged through the guide 22 on the cross piece 23, the cross piece being arranged at the inner side of the partition 15. The valve 20 is held to its seat by the spring 24 which is provided with a tensioning screw 25. The cylinder is provided with a supporting bracket 26 adapted to be inserted in the channel-shaped cross piece 2 of the vehicle body and secured by the bolts 27.

With the parts thus arranged the shock absorber not only checks the rebound but also supplements the spring 3 when the same is subjected to any undue compression. The rebound of the spring 3 is controlled by the passage of the fluid through the valve 20, the spring 24 being adjusted to secure the desired action or result.

My improved shock absorber is comparatively simple and economical to produce. It may be easily and quickly installed and is very efficient, its action being varied according to the intensity of the rebound.

Having thus described my invention, what I claim as new and desire to secure by Letters Patent is:

1. The combination in a structure of the class described comprising a running gear member, a body member and a supporting spring for said body member mounted on said running gear member, of a fluid cylinder mounted on said body member and having a transverse partition providing a cylinder at one end and a fluid chamber, said partition having a central cylinder discharge port therein, a piston, an outwardly opening valve for said discharge port provided with an inwardly projecting stem, a cross member disposed within said cylinder and constituting a support for said stem, a seating spring for said valve, means for adjusting the tension of said seating spring, a passage connecting said discharge chamber with said cylinder and open to the inner end of the cylinder beyond the stroke of the piston and having a port provided with a return check cylinder inlet valve connecting said passage with said cylinder at a point beyond the out stroke of the piston, a rock shaft disposed transversely of the cylinder at the inner end thereof, an arm on said rock shaft within the cylinder, a connecting rod connecting said piston to such arm, an actuating arm on said rock shaft, and a link connecting said actuating arm to said running gear member.

2. The combination in a structure of the class described of a fluid cylinder mounted on said body member and having a transverse partition providing a cylinder at one end and a fluid chamber, said partition having a central cylinder discharge port therein, a piston, an outwardly opening valve for said discharge port provided with an inwardly projecting stem, a cross member disposed within said cylinder and constituting a support for said stem, a seating spring for said valve, means for adjusting the tension of said seating spring, a passage connecting said discharge chamber with said cylinder and open to the inner end of the cylinder beyond the stroke of the piston and having a port provided with a return check cylinder inlet valve connecting said passage with said cylinder at a point beyond the out stroke of the piston, a rock shaft disposed transversely of the cylinder at the inner end thereof, and an arm on said rock shaft within the cylinder.

3. The combination in a structure of the class described comprising a running gear member, a body member and a supporting spring for said body member mounted on said running gear member, of a fluid cylinder mounted on said body member and having a transverse partition providing a cylinder at one end and a fluid chamber, said partition having a central cylinder discharge port therein, a piston, an outwardly opening valve for said discharge port, a seating spring for said valve, a passage connecting said discharge chamber with said cylinder and open to the inner end of the cylinder beyond the stroke of the piston and having a port provided with a return check cylinder inlet valve connecting said passage with said cylinder at a point beyond the out stroke of the piston, a rock shaft disposed transversely of the cylinder at the inner end thereof, an arm on said rock shaft within the cylinder, a connecting rod connecting said piston to such arm, an actuating arm on said rock shaft, and a link connecting said actuating arm to said running gear members.

4. The combination in a structure of the class described, of a fluid cylinder mounted on said body member and having a transverse partition providing a cylinder at one end and a fluid chamber, said partition having a central cylinder discharge port therein, a piston, an outwardly opening valve for said discharge port, a seating spring for said valve, a passage connecting said discharge chamber with said cylinder and open to the inner end of the cylinder beyond the stroke of the piston and having a port provided with a return check cylinder inlet valve connecting said passage with said cylinder at a point beyond the out stroke of the piston, a rock shaft disposed transversely of the cylinder at the inner end thereof, and an arm on said rock shaft within the cylinder.

In witness whereof, I have hereunto set my hand and seal in the presence of two witnesses.

DALLAS BOUDEMAN, Jr. [L. S.]

Witnesses:
MARGARET L. GLASGOW,
MARION G. REED.